(No Model.) 3 Sheets—Sheet 1.

J. H. WHITE.
GRAPHOPHONE.

No. 429,827. Patented June 10, 1890.

Witnesses
N. W. Mortimer
H. A. Kennedy

Inventor
Jno. H. White
By Phil T. Dodge
Attorney (No Model.) 3 Sheets—Sheet 2.

J. H. WHITE.
GRAPHOPHONE.

No. 429,827. Patented June 10, 1890.

ON LINE 1—1

ON LINE 1—1

Witnesses
N. W. Mortimer
H. R. Kennedy

Inventor
Jno. H. White
By Phil T. Dodge
Attorney (No Model.) 3 Sheets—Sheet 3.
J. H. WHITE.
GRAPHOPHONE.
No. 429,827. Patented June 10, 1890.
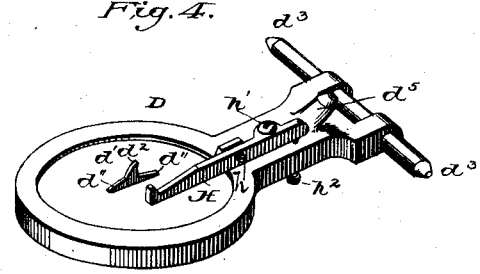
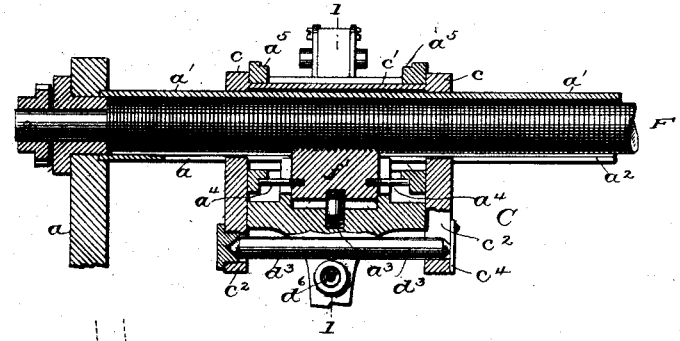
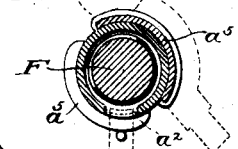
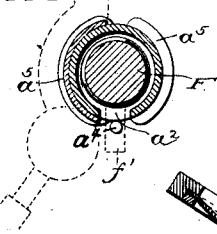
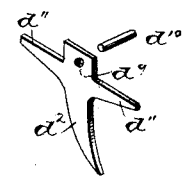
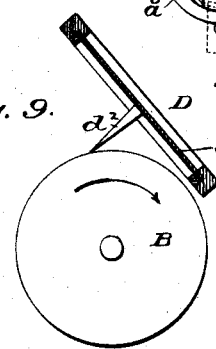
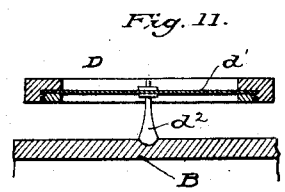
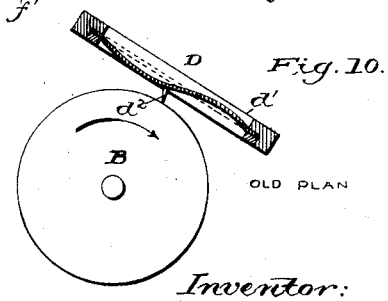
Witnesses:
Inventor:
J. H. White
By his Atty
Phil. T. Dodge

UNITED STATES PATENT OFFICE.

JOHN H. WHITE, OF WASHINGTON, DISTRICT OF COLUMBIA.

GRAPHOPHONE.

SPECIFICATION forming part of Letters Patent No. 429,827, dated June 10, 1890.

Application filed April 9, 1889. Serial No. 306,497. (No model.)

*To all whom it may concern:*

Be it known that I, JOHN H. WHITE, of Washington, in the District of Columbia, have invented certain Improvements in Graphophones, of which the following is a specification.

This invention relates more especially to that class of graphophones and phonographs in which the recording and reproducing devices are carried lengthwise of a rotary record-cylinder by a supporting-screw, although certain of the improvements are also applicable in instruments of other forms.

The invention relates, primarily, to improvements in the movable carriage used to sustain the recording and reproducing diaphragms and their adjuncts, designed to facilitate the return of the carriage to the starting-point and the bringing of one diaphragm or the other into action, as required.

It also relates to the maintaining of the diaphragm and the recording-cutter attached thereto in such relations to the record-cylinder that the cutting-strains are applied in the direction of the length of the tool, instead of laterally thereto, whereby the buckling and twisting of the diaphragm is prevented and other advantages secured.

It also relates to an improved adjustable stop to limit the motion of the diaphragm and the depth of cut.

It also relates to the formation of the recording-tool of uniform or preferably diminished width above its cutting-point to prevent lateral displacement of the material forming the walls between the record-grooves.

It also relates to the attachment of the recording-tool to the diaphragm in an improved manner.

It also relates to the formation of a sound-conducting tube in such manner that one end is removable freely with the diaphragm, while the remaining portion is fixed to the machine.

It also consists in various minor features, hereinafter fully explained.

With the exception of the parts hereinafter specifically claimed, the machine may be in all respects of ordinary construction, and I have therefore limited the drawings to an illustration of my improved features and the parts co-operating directly therewith.

Figure 1:
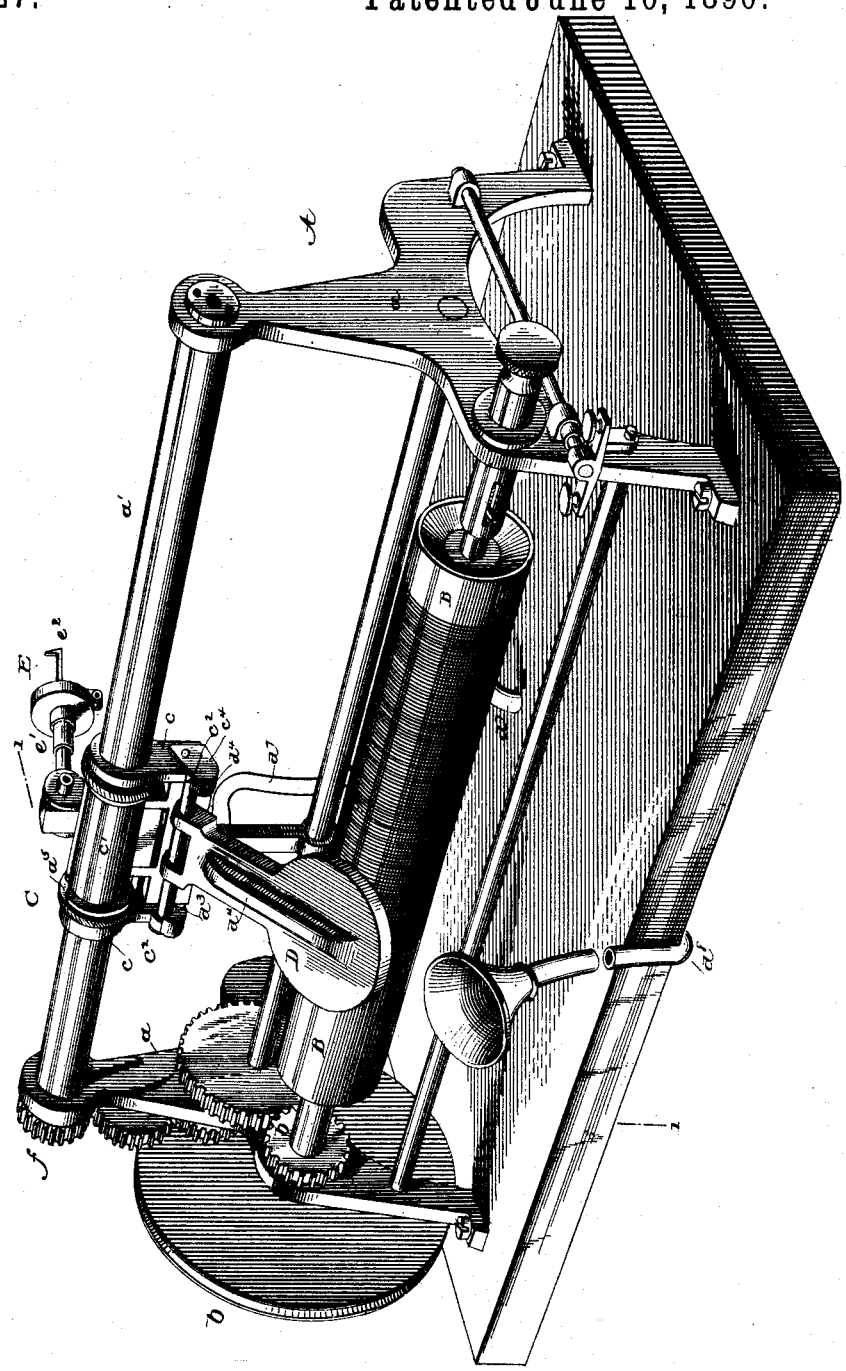
Figure 2:
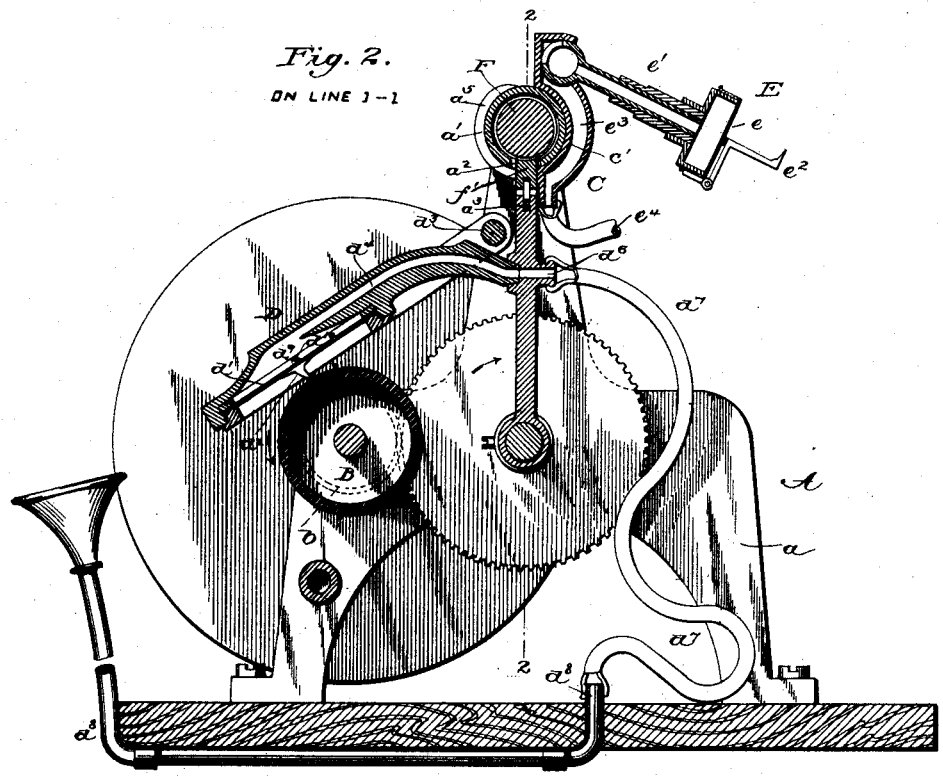
Figure 3:
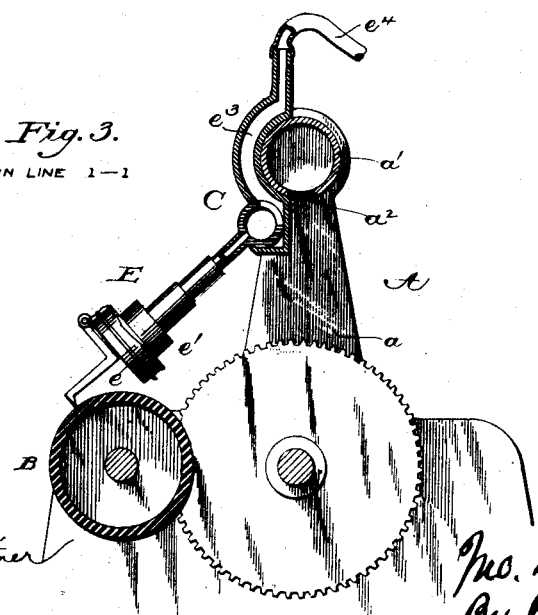

In the accompanying drawings, Figure 1 is a perspective view of a graphophone with my improvements incorporated therein. Fig. 2 is a transverse vertical section of the same through the plane of the recording and transmitting devices on the line 1 1 of Fig. 5, the recording-diaphragm being in operative position. Fig. 3 is a similar view on the line 1 1 of Figs. 1 and 5, with the recording devices removed and the reproducing devices in operative position. Fig. 4 is a perspective view of the recording-diaphragm and its support, known as the "recorder," in an inverted position. Fig. 5 is a vertical longitudinal section through the movable carriage and its adjuncts on the line 2 2 of Fig. 2. Figs. 6 and 7 are cross-sections on the line 1 1 of Fig. 5, showing the parts in different positions. Fig. 8 is a perspective view showing the recording-tool detached from the diaphragm. Fig. 9 is a vertical section showing the diaphragm and recording-tool in the preferred relations to the record-cylinder. Fig. 10 is a similar view illustrating the ordinary arrangement of a diaphragm and recording-tool and their objectionable mode of action. Fig. 11 is a front view, on an enlarged scale, of the cutting style or recorder, the recording-cylinder being shown in section.

Referring to the drawings, A represents the rigid main frame, consisting in the present instance of end plates $a$, suitably connected by cross-bars and by the rigid tube $a'$.

B represents the record-cylinder, movably mounted between supporting-spindles, one of which receives motion through the driving-wheel $b$ thereon.

C represents the sliding carriage mounted on and around the guide-tube $a'$ and intended to sustain the recorder D and reproducer E, hereinafter described in detail.

One of my improvements consists in the peculiar construction of this carriage and of the devices for imparting motion thereto, so that it may be quickly adjusted longitudinally to bring the recorder or reproducer in the required relation to the record-tube. The guide-tube $a'$ contains a longitudinal feed-screw F, suitably sustained at its ends to turn therein, and provided at one end with a pinion $f$, from which it receives motion through intermediate gear from the driving-wheel $b$, as in existing machines. The guide-tube $a'$ has a longitudinal slot $a^2$ in its under side to expose the screw and to admit a segmental nut $f'$, mounted in the carriage for the purpose of imparting motion to the latter.

The carriage C consists of a non-rotating sleeve $c$, which closely encircles the guide-tube and by an external collar $c'$, which in turn encircles the sleeve, and which is free to make a half-revolution thereon, its ends being usually milled that it may be readily turned by hand. The nut $f'$ is seated in the non-rotating sleeve $c$, and is urged upward into engagement with the screw by an underlying spring $a^3$, and is provided at its two ends with projecting arms $a^4$. The external collar $c'$ is formed at its ends with peripheral ribs or cams $a^5$ in position to ride on top of the arms $a^4$ of the nut. At their ends these cams $a^5$ approach the screw, so that when the collar $c'$ is turned to its extreme position in either direction the arms of the nut are released and the spring permitted to keep the nut in engagement with the screw, so that the rotation of the latter will cause the movement of the carriage along its guide. When, however, the collar $c'$ is turned in either direction, the raised portion of its cams $a^5$ depress the nut and disengage the same for the moment from the feed-screw, so that the carriage is free to slide on its guide. Thus it will be seen the rotation of the collar acts first to unlock the carriage, so that it may be moved freely from one end of the guide to the other, and thereafter to again engage the carriage with the screw. The non-rotating member $c$ of the carriage is provided with depending hook-shaped arms or sockets $c^2$ to receive and carry the detachable recorder D. This recorder consists, as usual, of an arm or frame having an annular lower end containing the diaphragm $d'$, to which the recording style or cutter $d^2$ is centrally affixed. At the opposite end the recorder is provided with the horizontal trunnions $d^3$ to enter the before-mentioned arms or sockets $c^2$ of the carriage, this construction permitting the recorder to be instantly connected to and disconnected from the carriage, and allowing its lower end to rise and fall independently. In order to prevent the least play between the recorder and the carriage, I give the ends of the trunnions $d^3$ a rounded or conical form. The socket which receives one of these trunnions is made of corresponding form, as shown in Fig. 5, while the other socket is provided with a side spring $c^4$ to act on the other trunnion and urge the same endwise. The spring-pressure thus applied to the trunnions keeps them snugly in place.

Heretofore it has been customary to combine with the recorder a flexible tube leading to a mouth-piece, the arrangement being such that it was necessary either to remove the tube with the recorder or to disconnect it therefrom, the recorder being liable in either case to be affected when in operative position by strains carelessly applied to the tube. To overcome these difficulties, I form or secure one end of the tube on the reproducer in position to connect with the remaining portion, the construction being such that the sections will be automatically connected and disconnected by the act of applying or removing the recorder. In the preferred form the tube-section on the reproducer connects with a section on the carriage, whence the flexible section is continued to a fixed holder on the carriage with which the mouth-piece connects.

In Figs. 1 and 2, $d^4$ is a tube formed on the recorder and leading from a point above the diaphragm upward to a point near the supporting-trunnions, where it terminates in a conical mouth $d^5$. This mouth enters the end of the tube-section $d^6$, fixed to the carriage. From the portion $d^6$ the flexible tube may lead directly to a mouth-piece; but it is preferred to extend the flexible section $d^7$ to a fixed bearing $d^8$ on the frame, and thence to the mouth-piece. It will be seen that under this arrangement strains applied at the mouth-piece are received laterally through the connection $d^8$ upon the main frame, it being impossible to affect either the carriage or the reproducer thereby. The mouth-piece may be rigidly connected at $d^8$.

As regards the connections between the tube-sections on the recorder and the remaining section, they may be formed in any appropriate manner at the point of union, the only requirement being that they shall be free to separate when the recorder is removed from the machine.

In instruments of the present class as heretofore constructed the recording style or cutter has but a narrow bearing on the diaphragm at its point of attachment thereto. In consequence of this fact I have discovered that the lateral strains applied to the lower end of the recording-style cause it to yield or tip in such manner as to twist or buckle the diaphragm, as indicated in Fig. 10, the diaphragm being bent upward on the rear side and downward on the front side of the style. The effect of this buckling action is to stiffen the diaphragm transversely, and thus impair the freedom of its vibration. This fact coupled with the changing position of the style results in the production of imperfect records. To avoid this difficulty, maintain the style at all times perpendicular to the surface of the diaphragm, and prevent the latter from twisting, I attach the style or cutter in the manner shown in Figs. 2 and 8, the upper end of the style being formed with a perforated tenon $d^9$ to pass through the diaphragm and receive the fastening-pin $d^{10}$, and also to provide it with two long arms or shoulders $d^{11}$ to bear on the under surface of the diaphragm. Having inserted the tenon through the diaphragm and fastened the same by the pin, I complete the operation by the application of a drop of sealing-wax or similar material to the back of the diaphragm over and around the pin and tenon. The wax serves not only to keep the pin in place, but to insure a close union between the parts.

In this class of instruments as heretofore constructed it has been customary to attach the recording-style to the diaphragm in a position perpendicular to its face, and to arrange the diaphragm in such relation to the record-cylinder that the style reciprocated in a direction perpendicular, or practically so, to the record-surface, or, in other words, in a radial direction with reference to the cylinder. Under this arrangement the record-surface acts laterally on the end of the style in a direction practically parallel with the face of the diaphragm and at right angles to the direction in which the diaphragm and style vibrate. I have ascertained that this action tends to the production of imperfect records, and that the imperfections due to this source may be overcome by arranging the diaphragm and style in such relation to the record-cylinder that the style will reciprocate in a line oblique to the record-surface—that is to say, in a line parallel with and in close proximity to a tangent to the record-cylinder, as shown in Fig. 9. It will be observed that under the arrangement here shown the style stands at an inclination instead of perpendicular to the record-surface. In other words, it has a reciprocation in the direction in which the record-groove is formed. The longitudinal axis of the style is in a line passing through the cylinder between the circumference and the axis thereof. It is to be understood that my invention contemplates the location of the axis of the style in a line approximately tangential to the record-cylinder, and that it does not include a style standing in a substantially radial position.

The difference between my method of locating the style and that in general use will be readily understood by referring to Fig. 2, which represents the ordinary perpendicular style. It is to be understood that I propose to use the arrangement shown in Fig. 9 in connection with the parts and devices shown in the other figures.

When the diaphragm is at rest, the point of the style stands somewhat below the surface of the record-cylinder. Heretofore the style has been made with its sides or edges parallel or divergent above that point which is normally at the surface of the cylinder, so that when the style was carried downward by the diaphragm the upper portion of its cutting-edges tended to crowd the material laterally between the groove in the course of formation and the preceding groove, or, in other words, to force the material over into the preceding groove. As a result of this action, the reproducing-style is caused to produce false sounds. To overcome this difficulty, I form my style, preferably, as shown in Fig. 12, so that when viewed from the front it presents a slightly-rounded cutting-edge at the lower extremity and side faces, which converge from this edge upward. Good results may be secured, however, by a style having its two sides parallel from the lower extremity or cutting-edge upward, as shown in Fig. 8. When the style in either of these forms sinks below its normal position, it has no tendency to increase the width of the groove or to laterally displace the material.

My recording-style, having the form shown, is also advantageous in its action in that it has less friction against the side walls of the groove than those of ordinary construction, so that it permits the diaphragm to move with greater freedom.

In order to limit the depth to which the recording style or cutter acts I employ an adjustable rest or stop of the peculiar construction shown in Fig. 4, in which H represents a stop-lever pivoted at $h$ to a stud on the under surface of the recorder. This lever terminates at one end adjacent to the recording-style in suitable form to ride upon the surface of the record-cylinder. At the opposite end it is acted upon by a depressing-screw $h'$, passing therethrough and threaded into the recorder, and also acted upon by a lifting-screw $h^2$, threaded into the recorder and acting on the lever. By means of these two screws the lever may be adjusted positively and accurately in both directions, and thus the position of its lower or supporting end controlled with great nicety in relation to the point of the style.

I am aware that other adjustable supports have been used for this purpose, and my invention in this regard is limited to the particular construction of parts herein shown.

The reproducer, which is a permanent part of the machine, is hinged to the rotary collar $c'$, forming part of the carriage. When it is required to employ the recorder, the reproducer may be drawn backward out of position, as shown in Figs. 1 and 2, by simply turning the collar $c'$ in the proper direction, after which the recorder may be connected to the carriage. When the reproducer is to be used, it is only necessary to remove the recorder and turn the collar in the opposite direction until the reproducer is brought to the position shown in Fig. 3. The reproducer consists of a diaphragm $e$, mounted on the enlarged end of a tube $e'$ and acted upon by a pivoted style or lever $e^2$, the lower end of which rides in the record-groove of the cylinder. The style is of L form. It is pivoted at one end to the supporting-tube, arranged to act at the opposite end of the record-cylinder, and cemented or otherwise connected at an intermediate point to the diaphragm, so that when its end is lifted by elevations in the record-surface it acts to move the diaphragm outward from the tube—that is to say, away from the ear of the listener at the opposite end. The upper end of the sound-conducting tube $e'$ is journaled to the end of a tube $e^3$, formed on the carriage and supplied with a flexible tube $e^4$, terminating, preferably, in one or more ear-pieces. The jointing or hinging of the reproducer to the collar admits of its rising and falling freely when in operative position, while the collar is held from rotation.

Having thus described my invention, what I claim is—

1. In a graphophone, a guide, in combination with a sliding carriage mounted permanently thereon and provided with supports for the detachable recorder and the reproducer permanently jointed to the carriage to be turned out of operative position.

2. In a graphophone, a sliding carriage having a non-rotating portion provided with supports for a detachable recorder and a rotatable portion having the reproducer attached thereto, substantially as described and shown.

3. In a graphophone, the combination, substantially as described, of the horizontal guide, a rigid sleeve encircling said guide and arranged to both slide and rotate thereon, and the diaphragm-sustaining frame hinged to said collar to swing vertically, whereby the diaphragm is permitted to rise and fall independently of the collar, and also permitted to assume and remain in an inoperative position on the machine.

4. In a graphophone, the horizontal guide, the feed-screw, the sliding carriage on the guide, the diaphragm-support attached to said carriage, a movable nut in the carriage to engage the screw, and an independently-revoluble collar mounted on the carriage and carrying a cam to adjust the nut.

5. The tubular guide and the feed-screw therein, in combination with the sliding non-rotating sleeve, the adjustable nut, the rotary collar with cam-surfaces to actuate the nut, and the reproducer attached to the collar, whereby the rotation of the collar is caused to lock and unlock the carriage, and also throw the reproducer into or out of operative position, as required.

6. In combination with the detachable diaphragm-frame having trunnions $d^3$, the sustaining-carriage having the hook-like bearings to receive the trunnions, and the spring $c^4$, acting in an axial direction on one of said trunnions, whereby end-play of the trunnions in the bearings is prevented.

7. In combination with the non-rotating sleeve, the rotary collar having the curved tube or passage $e^3$ thereon, as shown, and the reproducer-tube jointed thereto.

8. In combination with the recorder, the lever $d^6$, pivoted thereto, and the two adjusting-screws acting on the lever in opposite directions, as shown.

9. In combination with the recorder and its supporting-carriage, the blast-tube mounted on the recorder, the blower, and the intermediate flexible tube.

10. In a graphophone, the combination of the removable recorder having the tubular trunnion, the carriage having a passage to register therewith, and a blast mechanism communicating with said passage.

11. In a graphophone, a sustaining-carriage and a tube terminating thereon, in combination with a removable recorder having a tube adapted to automatically connect with and disconnect from the first-named tube as the recorder is applied to and removed from the carriage.

12. In a graphophone, the combination of a traveling carriage, a tube fixed to the frame, a flexible tube leading from the fixed tube to the carriage and fixed to the latter, and a frame or arm mounted on the carriage and provided with a style-carrying diaphragm, and with a tube or passage leading from the space above the diaphragm to the tube connected with the carriage.

13. In a graphophone, the combination of a recording-cylinder, a recording-diaphragm, and a recording style or cutter rigidly attached to the diaphragm, said diaphragm and style arranged in such relation to the cylinder that the style reciprocates endwise in a line passing through the cylinder between its center and circumference and near the latter—that is to say, in a line closely approximating a tangent to the cylinder—whereby the strains are applied in the direction of the length of the style, the style relieved from said strains, and the buckling of the diaphragm avoided.

14. In combination with the diaphragm, the style or cutter having the underlying shoulders and tenon, the pin passing through said tenon, and the adhesive material applied thereto.

15. In a graphophone, a recording-style having its width reduced from the point upward.

16. In a graphophone, a recording style or cutter having, when viewed from the front, a rounded lower end and a diminished width from the lower end to the top of the cutting-edges.

In testimony whereof I hereunto set my hand, this 4th day of April, 1889, in the presence of two attesting witnesses.

JNO. H. WHITE.

Witnesses:
W. R. KENNEDY,
W. W. MORTIMER.